(12) United States Patent
Kobayashi et al.

(10) Patent No.: US 8,699,046 B2
(45) Date of Patent: Apr. 15, 2014

(54) IMAGE FORMING SYSTEM, LINKING APPARATUS AND RECORDING MEDIUM

(75) Inventors: Minako Kobayashi, Ikeda (JP);
Katsuhiko Akita, Amagasaki (JP);
Takeshi Minami, Amagasaki (JP);
Kazuya Anezaki, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 307 days.

(21) Appl. No.: 13/079,039

(22) Filed: Apr. 4, 2011

(65) Prior Publication Data
US 2011/0249285 A1    Oct. 13, 2011

(30) Foreign Application Priority Data
Apr. 8, 2010  (JP) ................................ 2010-089179

(51) Int. Cl.
*G06F 15/00*    (2006.01)

(52) U.S. Cl.
USPC ........................................................ 358/1.13

(58) Field of Classification Search
USPC ............................................... 358/1.13, 1.15
See application file for complete search history.

(56) References Cited

U.S. PATENT DOCUMENTS

2004/0036903 A1*  2/2004  Azami .......................... 358/1.13
2006/0191435 A1   8/2006  Fujihara

FOREIGN PATENT DOCUMENTS

| JP | 2000-165419 A | 6/2000 |
| JP | 2002-244833 A | 8/2002 |
| JP | 2004-274264 A | 9/2004 |
| JP | 2005-094681 A | 4/2005 |
| JP | 2009-110272 A | 5/2009 |

OTHER PUBLICATIONS

Office Action (Notification of Reasons for Rejection) dated Apr. 10, 2012, issued in corresponding Japanese Patent Application No. 2010-089179, and an English Translation thereof. (17 pages).

* cited by examiner

*Primary Examiner* — Saeid Ebrahimi Dehkordy
(74) *Attorney, Agent, or Firm* — Buchanan Ingersoll & Rooney PC

(57) ABSTRACT

An image forming system includes: an image forming apparatus; and a linking apparatus that is linked with the image forming apparatus. The linking apparatus is operable in any of a plurality of modes including a first mode of contacting the image forming apparatus and executing a specific operation and a second mode of not contacting the image forming apparatus for a purpose of executing the specific operation. The image forming apparatus includes a mode shift command unit that, when the image forming apparatus shifts to a power saving mode, notifies the linking apparatus of a shift command indicating that the linking apparatus should be shifted to the second mode. Moreover, the linking apparatus includes: an operation mode control unit that shifts the linking apparatus to the second mode based on the shift command; and an access control unit that, after the shift to the second mode, prohibits the contact with the image forming apparatus, which is performed for the purpose of executing the specific operation.

20 Claims, 13 Drawing Sheets

Fig.5

| JOB ID | JOB NAME | DESTINATION | DATE |
|---|---|---|---|
| JB1 ××× | DISTRIBUTED SCAN | SERVER ADDRESS AD1 | 2010/03/03 09:30:05 |
| JB2 ××× | PRINTER INFORMATION ACQUISITION | ADDRESS AD2 | 2010/03/03 10:03:50 |
| JB3 ××× | PRINT | ADDRESS AD3 | 2010/03/04 11:06:20 |
| JB4 ××× | PRINTER INFORMATION ACQUISITION | ADDRESS AD4 | 2010/03/04 16:08:15 |
| JB5 ××× | DISTRIBUTED SCAN | SERVER ADDRESS AD5 | 2010/03/04 18:20:05 |

| TYPE OF SOFTWARE | PRINTER DRIVER SW1 ACQUIRE PRINTER INFORMATION (DISPLAY TONER RESIDUAL AMOUNT AND THE LIKE) | DISTRIBUTED SCANNING APPLICATION SW4 |
|---|---|---|
| | BOX DOCUMENT LIST APPLICATION SW2 | SOFTWARE SW5 OF ALLOWING REFLECTION OF SETTING VALUES OF OTHER MFPs |
| | COUNT VALUE ACCUMULATION/LOG ACCUMULATION APPLICATION SW3 | |
| INFORMATION COLLECTING OPERATION BEFORE SHIFT TO CACHE MODE | ABLED (EXECUTED) | DISABLED (UNEXECUTED) |
| SPECIFIC OPERATIONS DURING CACHE MODE (COMMUNICATION PROHIBITION AND THE LIKE) | EXECUTED BY USING CACHE INFORMATION | STANDBY (WITHHELD) |
| OPERATION AFTER RETURN FROM CACHE MODE | EXECUTED AFTER OCCURRENCE OF NEW COMMAND | EXECUTED AFTER OCCURRENCE OF NEW COMMAND, AND WITHHELD OPERATIONS ARE IMMEDIATELY EXECUTED |
| OPERATION FOR ADVANCE NOTICE ON CACHE MODE START TIME | ADVANCE ACQUISITION OF CACHE INFORMATION | --- |
| OPERATION FOR ADVANCE NOTICE ON CACHE MODE END TIME | --- | --- |

Fig.13

| TYPE OF SOFTWARE | PRINT OUTPUT COMMAND BY PRINTER DRIVER SW1 |
|---|---|
| INFORMATION COLLECTING OPERATION BEFORE SHIFT TO CACHE MODE | DISABLED (UNEXECUTED) |
| SPECIFIC OPERATIONS DURING CACHE MODE (COMMUNICATION PROHIBITION AND THE LIKE) | STANDBY (WITHHELD) (HOWEVER, RESUME TIME IS DISPLAYED) |
| OPERATION AFTER RETURN FROM CACHE MODE | EXECUTED AFTER OCCURRENCE OF NEW COMMAND, AND WITHHELD OPERATIONS ARE IMMEDIATELY EXECUTED |
| OPERATION FOR ADVANCE NOTICE ON CACHE MODE START TIME | --- |
| OPERATION FOR ADVANCE NOTICE ON CACHE MODE END TIME | RESUME TIME IS DISPLAYED DURING CACHE MODE |

IMAGE FORMING SYSTEM, LINKING APPARATUS AND RECORDING MEDIUM

This application is based on Japanese Patent Application No. 2010-089179 filed on Apr. 8, 2010, the contents of which are hereby incorporated by reference.

BACKGROUND OF THE INVENTION

1. Field of the Invention

The present invention relates to an image forming system and a technology related to the image forming system.

2. Description of the Related Art

In recent years, an image forming apparatus has been present, which is provided with a "sleep mode (power saving mode)" of restrictively supplying power only to a part of an apparatus in order to achieve a reduction of power consumption.

Moreover, following the development of the network technology, a technology has been present, which is for transferring a variety of data between the image forming apparatus and another apparatus (also referred to as a linking apparatus) linked with the image forming apparatus as described above. For example, in printer driver software executed in a computer connected to the image forming apparatus through a network, such a technology has been present, in which data regarding a toner residual amount in the image forming apparatus is acquired from the image forming apparatus, and the toner residual amount is displayed.

Incidentally, even in the case of having entered a sleep state once, the image forming apparatus provided with the sleep mode immediately returns from the sleep state to a normal state upon receiving an access from the external computer. Therefore, in particular, when a frequency of the access from the external computer is large, the image forming apparatus frequently returns from the sleep state, and an effect of the reduction of the power consumption cannot be obtained sufficiently.

In the view of the above, Japanese Patent Laid-Open Application No. 2000-165419 proposes a technology for further reducing the power consumption by avoiding frequent return operations from the sleep state.

In the technology of Japanese Patent Laid-Open Application No. 2000-165419, a server computer (hereinafter, also simply referred to as a server) is provided separately from such an apparatus (also referred to as a client terminal) having a sleep function. Moreover, a "response message" equivalent to a message destined to the client terminal is transmitted from the client terminal to the server in advance and is stored in the server. Then, while the client terminal is sleeping, a message destined to the client terminal from another external apparatus is received by the server in a proxy manner, and the server transmits, to the external apparatus, a "response message" corresponding to the message received from the external apparatus. Specifically, for the message transmitted from the external apparatus, on behalf of the client terminal, the server returns the "response message", which is registered in advance, to the external apparatus (that is, makes a proxy response). At this time, the sleep state of the client terminal is maintained. Therefore, the client terminal is avoided returning from the sleep state frequently.

However, in a proxy response technology by the server, such problems are present that concentration of loads to the server occurs since a variety of processing is performed in the server intensively.

SUMMARY OF THE INVENTION

It is an object of the present invention to provide an image forming system capable of easily realizing suppression of the returns from the power saving mode while avoiding the concentration of the loads to the server, and to provide a technology related to the image forming system.

A first aspect of the present invention provides an image forming system including: an image forming apparatus; and a linking apparatus that is connected to the image forming apparatus through a network, is linked with the image forming apparatus, and executes a specific operation, wherein the linking apparatus is operable in any of a plurality of operation modes including a first mode of contacting the image forming apparatus and executing the specific operation and a second mode of not contacting the image forming apparatus for a purpose of executing the specific operation, the image forming apparatus includes: a mode shift command unit that, when the image forming apparatus shifts to a power saving mode, notifies the linking apparatus of a shift command indicating that the linking apparatus should be shifted to the second mode, the linking apparatus includes: an operation mode control unit that shifts the linking apparatus to the second mode based on the shift command; a determination unit that, in response to the shift command, determines whether or not to receive cache information for the specific operation from the image forming apparatus before the shift to the second mode in accordance with a type of the specific operation executed by the linking apparatus itself; and an access control unit that, after the shift to the second mode, prohibits the contact with the image forming apparatus, the contact being performed for the purpose of executing the specific operation, and in a case where it is determined that the cache information should be received, the operation mode control unit of the linking apparatus transmits a transmission request of the cache information to the image forming apparatus, an information transmission unit of the image forming apparatus transmits the cache information to the linking apparatus in response to reception of the transmission request, and the operation mode control unit of the linking apparatus shifts the linking apparatus to the second mode in response to reception of the cache information.

A second aspect of the present invention provides a linking apparatus that is connected to an image forming apparatus through a network, is linked with the image forming apparatus, and executes a specific operation, the linking apparatus including: an operation mode control unit that sets an operation mode of the linking apparatus at any of a plurality of operation modes including a first mode of contacting the image forming apparatus and executing a specific operation and a second mode of not contacting the image forming apparatus for a purpose of executing the specific operation; a determination unit that, in response to a shift command notified by the image forming apparatus and indicating that the linking apparatus should be shifted to the second mode, determines whether or not to receive cache information for the specific operation from the image forming apparatus before the shift to the second mode in accordance with a type of the specific operation executed by the linking apparatus itself; and an access control unit that, after the shift to the second mode, prohibits the contact with the image forming apparatus, which is performed for the purpose of executing the specific operation, wherein, in a case where it is determined that the cache information should be received, the operation mode control unit of the linking apparatus transmits a transmission request of the cache information to the image forming apparatus, an information transmission unit of the image forming apparatus transmits the cache information to the linking apparatus in response to reception of the transmission request, and the operation mode control unit of the linking apparatus shifts the linking apparatus to the second mode in response to reception of the cache information.

A third aspect of the present invention provides a recording medium that records a computer program therein, the computer program causing a computer to execute processing, the computer being built in a linking apparatus that is connected to an image forming apparatus through a network, is linked with the image forming apparatus, and executes a specific operation, the processing including the steps of: a) receiving a shift command notified by the image forming apparatus and indicating that the linking apparatus should be shifted to any one operation mode among a plurality of operation modes including a first mode of contacting the image forming apparatus and executing the specific operation and a second mode of not contacting the image forming apparatus for a purpose of executing the specific operation; b) determining, in response to the shift command indicating that the linking apparatus should be shifted to the second mode, whether or not to receive cache information for the specific operation from the image forming apparatus before the shift to the second mode in accordance with a type of the specific operation executed by the linking apparatus itself; c) transmitting a transmission request of the cache information to the image forming apparatus in a case where it is determined, in the step b), that the cache information should be received; d) receiving the cache information transmitted from the image forming apparatus in response to reception of the transmission request; e) shifting the linking apparatus to the second mode in response to reception of the cache information, and thereafter prohibiting the contact with the image forming apparatus, the contact being performed for the purpose of executing the specific operation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a view showing job history data;

FIG. 12 is a view showing the respective operations summarized in a table format; and FIG. 13 is a view showing the respective operations summarized in a table format.

DESCRIPTION OF THE PREFERRED EMBODIMENTS

A description is made below of embodiments of the present invention with reference to the drawings.

<1. Outline of System>

Figure 1:
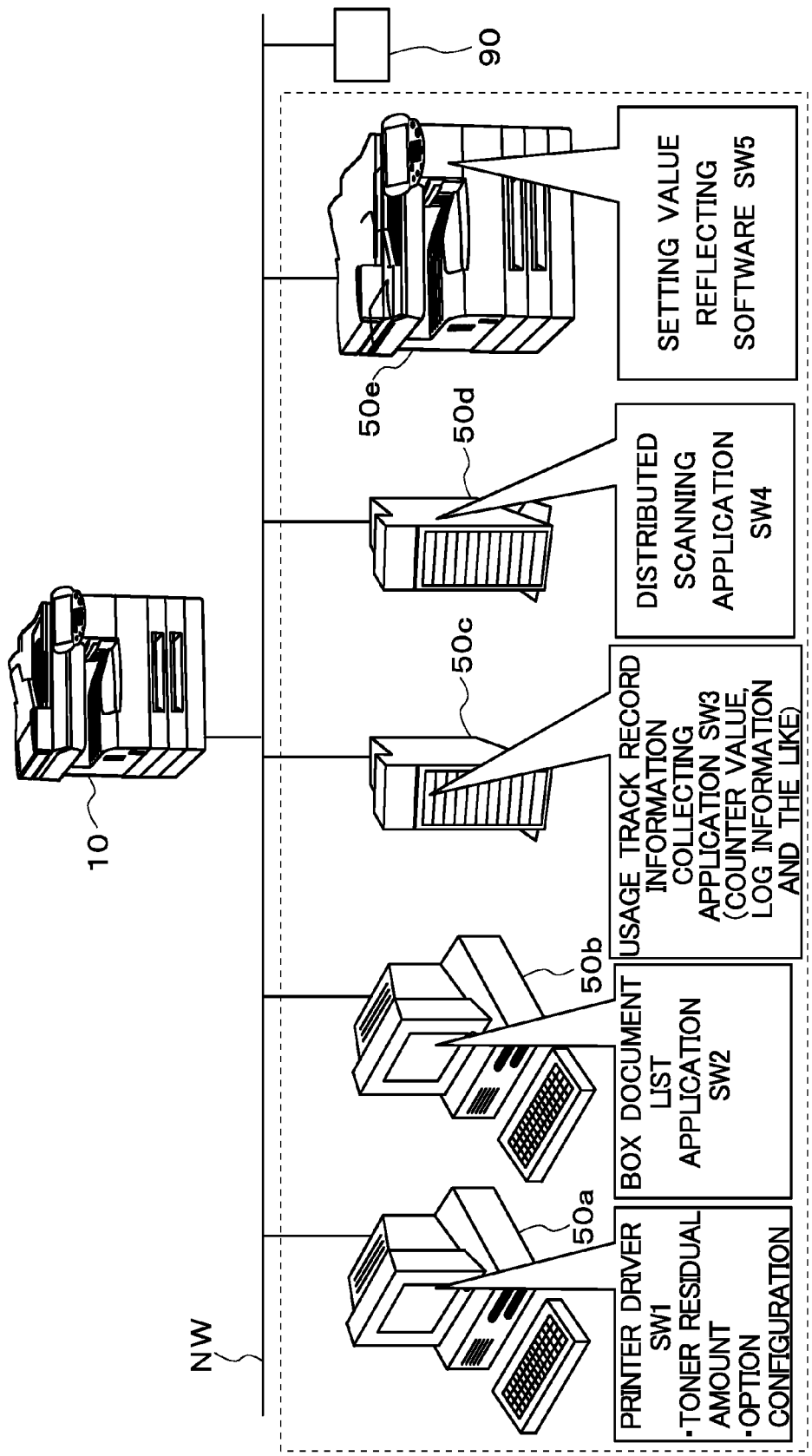
FIG. 1 is a schematic diagram showing a configuration of an image forming system.

FIG. 1 is a schematic diagram showing a configuration of an image forming system 100. This image forming system 100 includes a multi-function peripheral (also abbreviated as an MFP) 10 and a plurality of linking apparatuses 50 (50a, 50b, 50c, 50d, 50e and the like) linked with the MFP 10.

The MFP 10 is an apparatus (also referred to as a multi-function machine) provided with a scanner function, a printer function, a copier function, a facsimile communication function and the like. The MFP 10 is also referred to as an image forming apparatus. Meanwhile, as the linking apparatuses 50, there are illustrated: client computers (hereinafter, also simply referred to as clients) 50a and 50b; server computers (hereinafter, also simply referred to as servers) 50c and 50d; another MFP 50e; and the like.

The MFP 10 and the respective linking apparatuses 50 are connected to each other through a network NW, and are capable of performing network communication (data communication) with each other. Here, the network NW is composed of a LAN, a WAN, the Internet or the like. A connection mode of the respective apparatuses to the network NW may be wired connection or wireless connection.

Note that, as will be described later, a large number of apparatuses including another apparatus 90 and the like are connected to the network NW; however, it is preferable that some apparatuses among the large number of apparatuses partially function as the linking apparatuses in this system 100.

<2. Image Forming Apparatus>

Figure 2:
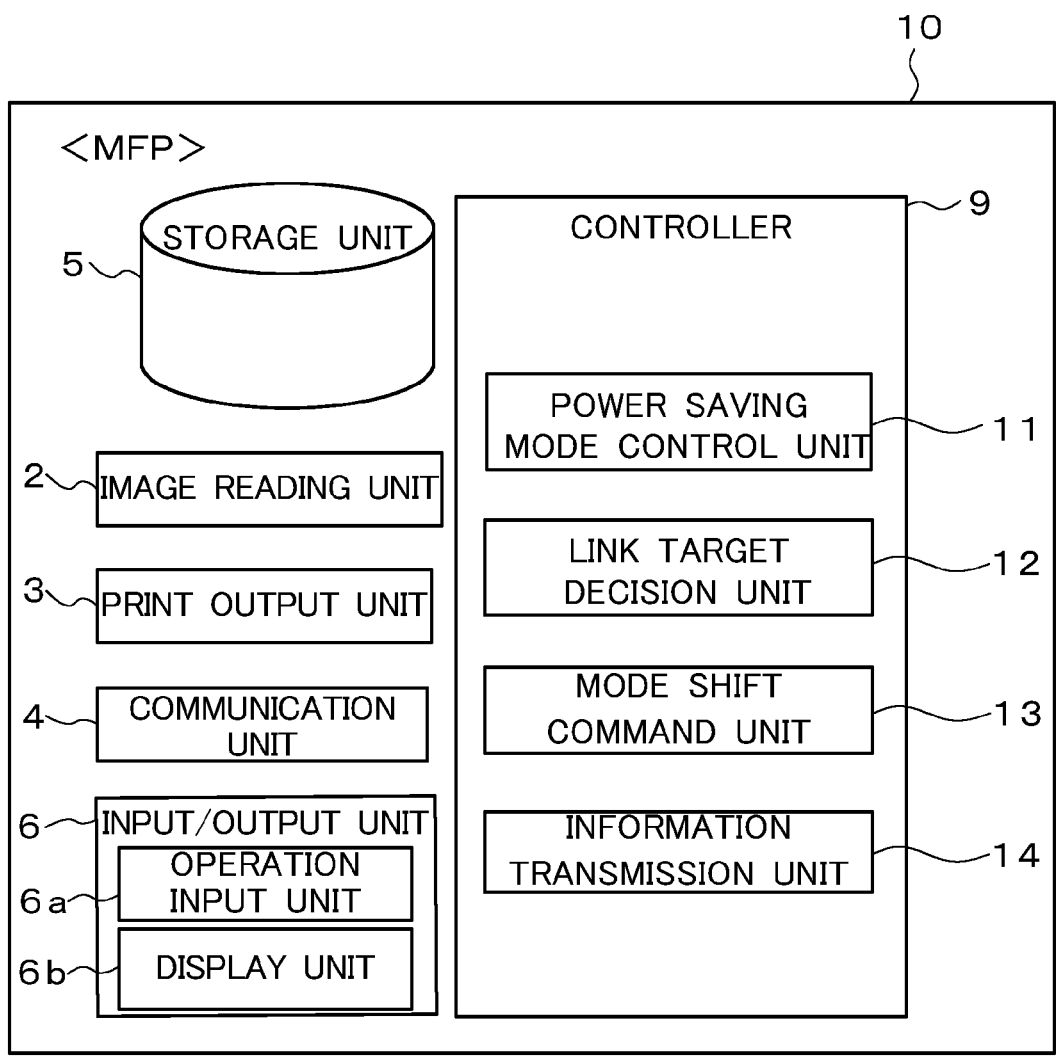
FIG. 2 is a functional block diagram showing a functional configuration of an MFP.

Next, a description is made of a detailed configuration of the MFP 10 while referring to FIG. 2. FIG. 2 is a functional block diagram showing a functional configuration of the MFP 10.

As shown in FIG. 2, the MFP 10 includes an image reading unit 2, a print output unit 3, a communication unit 4, a storage unit 5, an input/output unit 6, and a controller 9. The MFP 10 operates these respective units in combination with one another, and thereby realizes the respective functions as described above.

The image reading unit 2 is a processing unit that optically reads an original mounted on a predetermined position of the MFP 10, and creates image data (also referred to as an original image) of the original.

The print output unit 3 is an output unit that prints and outputs an image on a variety of media such as paper based on the image data regarding such a target image.

The communication unit 4 is a processing unit capable of performing facsimile communication through public lines and the like. Moreover, the communication unit 4 is capable of network communication through the network NW. In this network communication, a variety of protocols such as Transmission Control Protocol/Internet Protocol (TCP/IP) and File Transfer Protocol (FTP) are used, and use of the network communication enables the MFP 10 to transfer a variety of data with desired destinations. Note that the use of the network communication also enables the MFP 10 to transmit/receive electronic mail.

The storage unit 5 is composed of a storage device such as a hard disk drive (HDD). In this storage unit 5, there are stored the original image created by, for example, the image reading unit 2, and the like.

The input/output unit 6 includes an operation input unit 6a that receives an input to the MFP 10, and a display unit 6b that performs display output of various pieces of information.

The controller 9 is a control device that comprehensively controls the MFP 10, and includes a CPU and a variety of semiconductor memories (a RAM, a ROM and the like). The controller 9 is also expressed as a computer system built in the MFP 10. The variety of processing units operate under control of the controller 9, whereby the variety of functions of the MFP 10 are realized. For example, a desired image is optically read by using the image reading unit 2 under control of the controller 9, whereby an image (scan image) obtained by scanning the original is acquired, and the scanner function is realized. Further, the print output unit 3 prints and outputs the scan image, and thereby realizes the copy function. Moreover, the controller 9 also controls a variety of processing as described below.

The controller 9 executes, in the CPU, a predetermined software program (hereinafter, also simply referred to as a program) PG1 (not shown) stored in the ROM (for example, such as an EEPROM), and thereby realizes a variety of processing units. Note that the program PG1 may be recorded in a variety of computer-readable and portable (or non-transitory) recording media (USB memory and the like), may be read out from the recording media, and may be installed. Alternatively, the program PG1 may be downloaded through the network, and may be installed.

Specifically, the controller 9 realizes a variety of processing units including a power saving mode control unit 11, a linkage target decision unit 12, a mode shift command unit 13, an information transmission unit 14.

The power saving mode control unit 11 is a processing unit that controls execution of a power saving mode (sleep mode) of the image forming apparatus 10.

The linkage target decision unit 12 is a processing unit that decides an apparatus (linking apparatus 50) as a linkage target with the MFP 10 from among the large number of apparatuses connected to the network NW.

The mode shift command unit 13 is a processing unit that notifies the linking apparatus 50 of a shift command indicating that the linking apparatus 50 should be shifted to any of a plurality of operation modes including a normal mode and a cache mode (described later).

The information transmission unit 14 is a processing unit that transmits cache information CN (described later) to the linking apparatus 50 in response to a transmission request from the linking apparatus 50.

<3. Linking Apparatus>

<3-1. Outline of Linking Apparatus>

Figure 3:
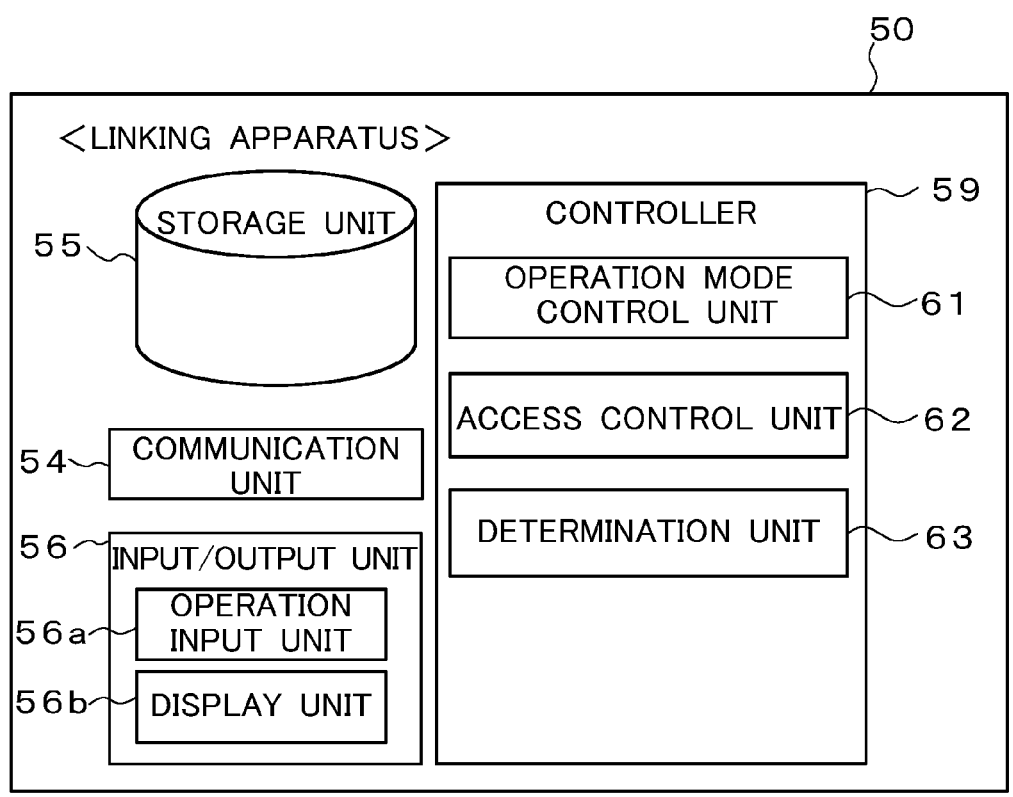
FIG. 3 is a functional block diagram showing a functional configuration of a linking apparatus.

Next, a description is made of a configuration of the linking apparatus 50 while referring to FIG. 3. FIG. 3 is a functional block diagram showing a functional configuration of the linking apparatus 50. Here, a description is first made of a functional configuration common to the plurality of linking apparatuses 50.

In a similar way to the MFP 10, the linking apparatus 50 includes a communication unit 54, a storage unit 55, an input/output unit 56, and a controller 59. Note that, though the print output unit and the image reading unit are not shown in FIG. 3, the print output unit and/or the image reading unit may be further provided.

A predetermined program PG5 (not shown) stored in a ROM of the controller 59 is executed in a CPU of the controller 59, whereby a variety of processing units 61 to 63 as shown in FIG. 3 are realized. The controller 59 is also expressed as a computer system built in the linking apparatus 50. Note that the program PG5 may be recorded in a variety of computer-readable and portable (or non-transitory) recording media (USB memory, CD-ROM and the like), may be read out from the recording media, and may be installed. Alternatively, the program PG5 may be downloaded through the network, and may be installed.

The operation mode control unit 61 is a control unit that controls a shift among operation modes in the linking apparatus 50. The access control unit 62 is a control unit that controls an access operation to the MFP 10. The determination unit 63 is a processing unit that determines whether or not to receive the cache information CN in response to the shift command from the MFP 10.

<3-2. Type of Linking Apparatus>

As mentioned above, five apparatuses 50a to 50e (see FIG. 1) are illustrated as the respective linking apparatuses 50 in this embodiment.

The linking apparatus 50a is a client computer in which a printer driver SW1 corresponding to the MFP 10 is installed. For example, the printer driver SW1 of the linking apparatus 50a is capable of communicating with the MFP 10, acquiring printer information (toner residual amount information and the like) of the MFP 10, and displaying the toner residual amount information and the like on a display screen of the printer driver.

Note that, in this embodiment, with regard to a printer information acquiring operation of the printer driver SW1, a contact prohibiting operation (described later) in a cache mode MD 52 is applied thereto, and meanwhile, with regard to a print command output operation of the printer driver SW1, the contact prohibiting operation (described later) in the cache mode MD 52 is not applied thereto. In such a way, higher priority is given to a print output operation, and a user can satisfy a print output request of his/her own.

The linking apparatus 50b is a client computer in which an application software program (hereinafter, also referred to as application software or simply referred to as an application or the like) SW2 that acquires list information (document list information) of a predetermined box (folder) of the MFP 10 is installed. For example, by using the application software SW2, the linking apparatus 50b is capable of communicating with the MFP 10, acquiring the list information of the predetermined box of the MFP 10, and displaying the list information on a display unit of the linking apparatus 50b.

The linking apparatus 50c is a server computer in which application software SW3 that acquires usage track record information (log information, count information and the like) of the MFP 10 is installed. For example, by using the application software SW3, the linking apparatus 50c is capable of communicating with the MFP 10, and acquiring and storing the usage track record information of the MFP 10. Moreover, the linking apparatus 50c is also capable of accumulating and storing the usage track record information.

The linking apparatus 50d is a server computer in which application software SW4 that distributes a scan image, being scanned by the MFP 10, to predetermined distribution destinations (respective MFPs, respective computers and the like) is installed. For example, by using the application software SW4, the linking apparatus 50d is capable of acquiring, through the network NW, the image (scan image) scanned by the MFP 10, and further distributing the scan image to one or a plurality of distribution destinations through the network. Moreover, when such distribution is completed, the linking apparatus 50d notifies the MFP 10 of such completion of the distribution.

The linking apparatus 50e is another MFP than the MFP 10. The MFP 50e executes a software program SW5 built therein, and is thereby capable of requesting that setting information of the MFP 50e be reflected on setting information of the MFP 10. Specifically, the MFP 50e can request that various pieces of the setting information (specifically, address information and the like), which are set in the MFP 50e by the user or an administrator, also be set as setting contents of the MFP 10. Moreover, in response to the request, the MFP 10 is capable of overwriting and updating the setting contents of the MFP 10 itself by setting information transmitted from the linking apparatus 50e.

<3-3. Decision Operation for Linking Apparatus>

As the linking apparatuses 50, the apparatuses 50a to 50e of the types as mentioned above are illustrated, and one or the plurality of apparatuses of all or partial types among these types are actually used as the linking apparatuses with the MFP 10. Thus, it is possible that, for the MFP 10, one or the plurality of apparatuses may be decided as the linking apparatuses 50. A description is made below of a decision operation for such linkage targets with the MFP 10.

Figure 4:
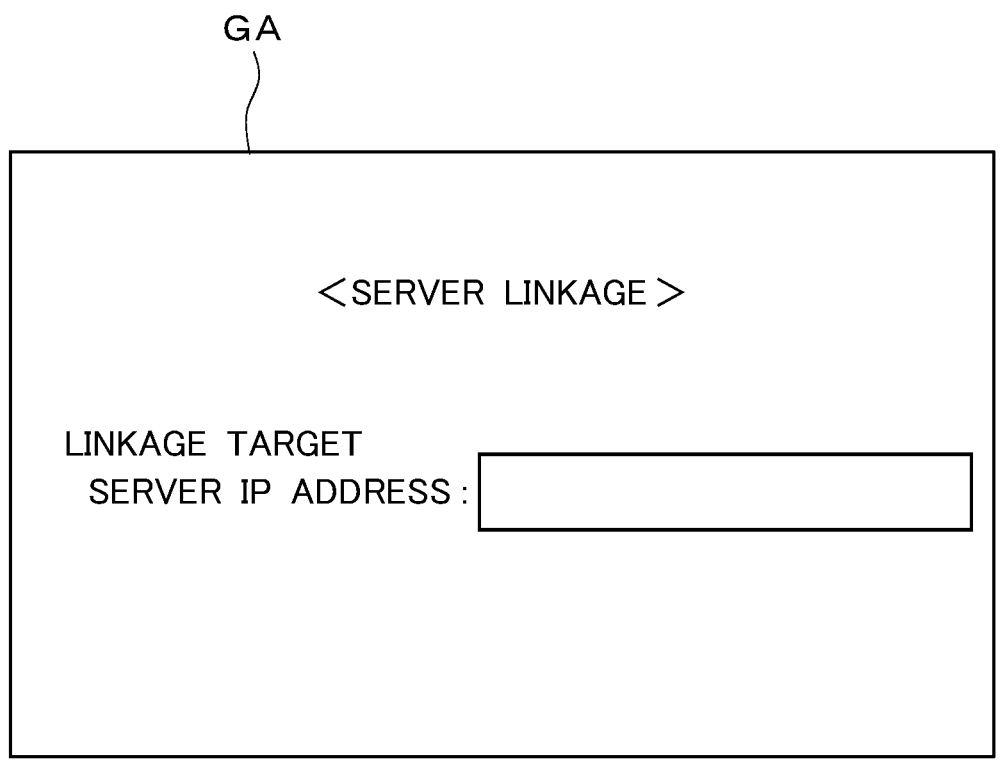
FIG. 4 is a view showing a registration screen of a linkage target apparatus.

Specifically, an operator of the MFP 10 is capable of manually designating and registering arbitrary apparatuses among the plurality of apparatuses connected to the network NW. For example, by using a screen GA as shown in FIG. 4, the operator is capable of designating and registering a specific server as the linking apparatus 50. In FIG. 4, the registration screen GA for an IP address of the linkage target server is shown. The linkage target decision unit 12 of the MFP 10 decides the linking apparatus 50 based on input contents (designation contents) by operation input of the operator. Thus, the operator of the MFP 10 can manually register the server as the linking apparatus 50 by using the registration screen.

Alternatively, the linking apparatus 50 may be automatically registered (automatically decided) based on job history data DA (see FIG. 5) of the MFP 10. Specifically, among the plurality of apparatuses connected to the MFP 10 through the network, a communication target apparatus in which a communication history within a predetermined period (latest one week, this day or the like) remains just needs to be decided as a linkage target apparatus (linking apparatus 50). For example, apparatuses with communication destination addresses AD3 to AD5 in which histories of jobs JB3 to JB5 are of "this day (Mar. 4, 2010 in FIG. 5)" among plural histories of jobs just need to be decided as the linking apparatuses 50. Thus, the linkage target decision unit 12 of the MFP 10 can decide (automatically register) the linking apparatus 50 based on information of the job history.

Moreover, such manual registration and such automatic registration may be used in appropriate combination with each other.

<4. Operations>

A description is made below of operations in this system 100. First, an operation mode of the MFP 10 and an operation mode of the linking apparatus 50 are sequentially described, and thereafter, detailed operations are described.

<4-1. Operation Mode of MFP 10>

The MFP 10 is capable of executing a normal mode MD11 and a power saving mode (sleep mode) MD12 in a switching manner. The power saving mode MD12 is a mode of restrictively supplying power only to a part (for example, some cooling fans, some control circuits and the like) of the MFP 10. The normal mode MD11 is a mode of supplying power to a variety of portions necessary for normal operations. Power consumption in the power saving mode MD12 is extremely smaller than power consumption in the normal mode MD11. Hence, the MFP 10 shifts from the normal mode MD11 to the power saving mode MD12, thus making it possible to achieve a reduction of the power consumption.

<4-2. Operation Mode of Linking Apparatus 50>

Each of the linking apparatuses 50 is operable in any of a plurality (here, two) of operation modes including: a normal mode MD51 of making contact (communication for inquiry or the like) with the MFP 10 and executing a specific operation; and a cache mode (non-communication mode) MD52 of not making contact (communication) with the MFP 10 for executing the specific operation. More specifically, when the MFP 10 shifts from the normal mode MD11 to the power saving mode MD 12, the operation mode of each of the linking apparatuses 50 is individually shifted from the normal mode MD51 to the cache mode MD52.

In the normal mode MD51, for example, the printer driver SW1 of the linking apparatus 50a communicates with the MFP 10, acquires the toner residual amount of the MFP 10, and displays the toner residual amount on the display screen of the printer driver. Meanwhile, in the cache mode MD52, the printer driver SW1 of the linking apparatus 50a does not communicate with the MFP 10. Specifically, the printer driver SW1 acquires the toner residual amount information from the MFP 10 in advance before shifting to the cache mode, and in the cache mode MD52, displays the toner residual amount on the display screen of the printer driver SW1 by using the toner residual amount information acquired in advance.

In accordance with this, when the MFP 10 shifts to the power saving mode, the linking apparatus 50a is shifted to the cache mode MD52, and comes not to execute the contact (inquiry) with the MFP 10, which is performed for the purpose of confirming the toner residual amount. In such a way, the inquiry from the linking apparatus 50a is avoided, and accordingly, the MFP 10 can be prevented from frequently returning from the power saving mode. Hence, the MFP 10 becomes capable of increasing an operation time in the power saving mode, and further reducing the power consumption. Moreover, in this system 100, it is not necessary to collect data for proxy responses in a server, and accordingly, it is also possible to avoid concentration of loads to the server, which has occurred in the related art. In other words, it is possible to easily realize suppression of returns from the power saving mode while avoiding the concentration of the loads to the server.

A description is made below in detail of the operations as described above while referring to FIGS. 6 to 9. Note that, in each of FIGS. 6 to 9, a communication operation between the MFP 10 and one of the plurality of linking apparatuses 50 is shown.

<4-3. Shift Operation to Cache Mode>

Figure 6:
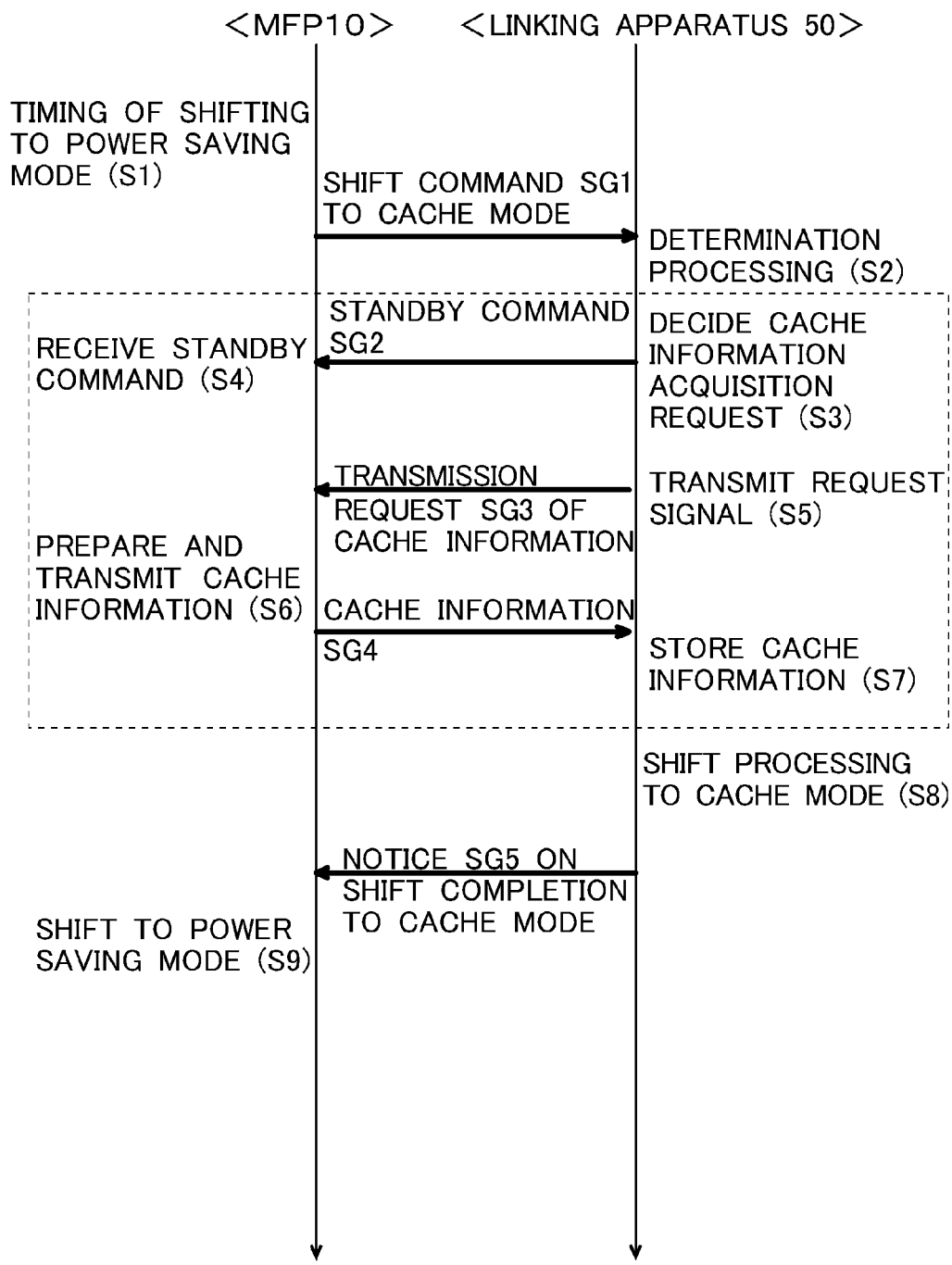
FIG. 6 is a chart showing operations in this system.

First, FIG. 6 is referred to. When such a condition is established that command input to the MFP 10 is not given for a fixed period (for example, 10 minutes), the power saving mode control unit 11 of the MFP 10 decides to shift from the normal mode MD11 to the power saving mode MD12 (step S1 of FIG. 6).

When the power saving mode control unit 11 of the MFP 10 decides to shift from the normal mode MD11 to the power saving mode MD12, the mode shift command unit 13 of the MFP 10 notifies the linking apparatus 50 of a shift command SG1. This shift command SG1 is a command signal indicating that the linking apparatus 50 should be shifted to the cache mode MD52. Thus, the shift command SG1 is sent out from the MFP 10 to the linking apparatus 50 when the MFP 10 shifts to the power saving mode MD12.

Meanwhile, upon receiving the shift command SG1, the linking apparatus 50 executes determination processing (step S2) in response to the shift command SG1.

In this determination processing, it is determined whether or not to receive the predetermined information (also referred to as the cache information) CN from the MFP 10 before the shift to the cache mode MD52. This cache information CN is information for use in the linking apparatus 50 at the time of the operation in the cache mode MD52. The cache information CN is also referred to as information that is stored temporarily (that is, temporarily stored information), information that is saved temporarily (that is, temporarily saved information), or the like.

For example, the printer driver SW1 of the linking apparatus 50a uses the cache information CN in the cache mode MD52, and accordingly, the linking apparatus 50a determines to receive the cache information CN. The same also applies to the software SW2 of the linking apparatus 50b and the software SW3 of the linking apparatus 50c.

Note that, as will be described later by referring to FIG. 7, the application software SW4 of the linking apparatus 50d does not use the cache information CN in the cache mode MD52, and accordingly, the linking apparatus 50d determines that it is not necessary to receive the cache information CN. The same also applies to the linking apparatus 50e. Thus, the linking apparatus determines whether or not to receive the cache information CN in accordance with the type of the specific operation (of the software) executed by the linking apparatus itself.

A description is first made below on the premise that, in the above-described determination processing (step S2), it is determined that the cache information CN should be received in the linking apparatus 50a or the like.

At this time, the linking apparatus 50 (specifically, the operation mode control unit 61) transmits, to the MFP 10, a standby command SG2 indicating that the MFP 10 should stand by for the shift to the power saving mode MD12 (step S3). Upon receiving the standby command SG2, the MFP 10 (specifically, the power saving mode control unit 11) stands by without performing the shift to the power saving mode MD12 (step S4).

Next, the operation mode control unit 61 of the linking apparatus 50 transmits a transmission request SG3 of the cache information CN to the MFP 10 (step S5).

Upon receiving the transmission request SG3, the information transmission unit 14 of the MFP 10 transmits the cache information CN (SG4) to the linking apparatus 50 in response to the reception of the transmission request SG3 (step S6).

Upon receiving the cache information CN, the linking apparatus 50 stores, in the storage unit 55, the cache information CN transmitted from the information transmission unit 14 of the MFP 10 (step S7).

Moreover, the operation mode control unit 61 of the linking apparatus 50 shifts the linking apparatus 50 to the cache mode MD52 in response to the reception (completion of the reception) of the cache information CN, and thereafter, notifies the MFP 10 of the completion of the shift to the cache mode MD52 (that is, a shift completion signal SG5) (step S8).

Upon receiving the transition completion signal SG5, the power saving mode control unit 11 of the MFP 10 shifts to the power saving mode MD12 (step S9). However, in the case where the MFP 10 is linked with the plurality of linking apparatuses 50, the power saving mode control unit 11 shifts to the power saving mode MD12 in response to that the shift completion signals SG5 are received from all of the linking apparatuses 50.

As described above, each of the linking apparatuses 50 is shifted to the cache mode MD52 based on each of the shift commands SG1, and the MFP 10 shifts to the power saving mode MD12.

Figure 7:
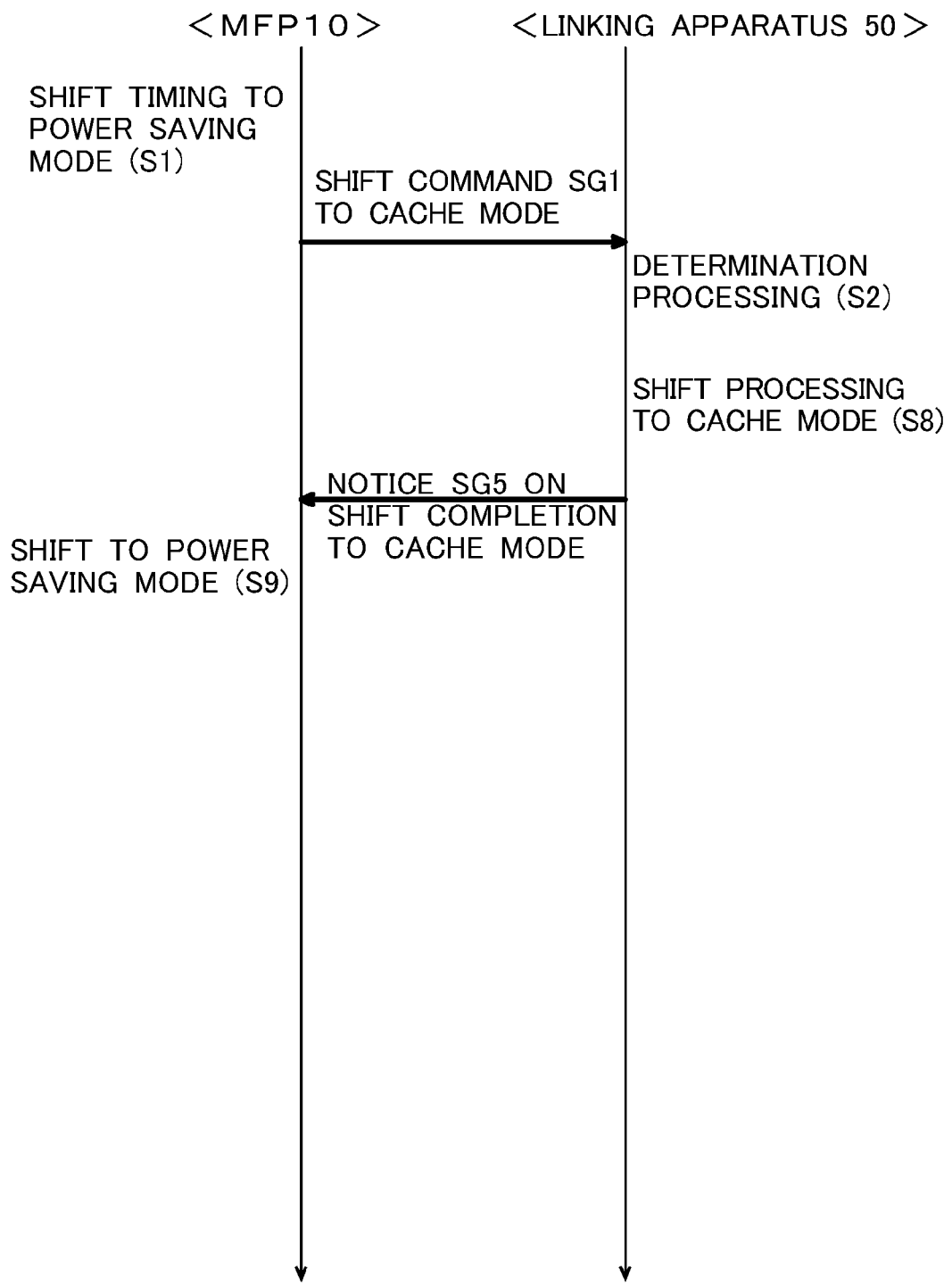
FIG. 7 is a chart showing operations in this system.

Next, while referring to FIG. 7, a description is made of the case where it is determined in the above-described determination processing (step S2) that it is not necessary to receive the cache information CN. Note that, in a similar way to FIG. 6, FIG. 7 is a chart showing the shift operation from the cache mode MD52 to the power saving mode MD12, and the like. However, FIG. 7 is different from FIG. 6 in that the operation of transferring the cache information CN and so on (that is, operations surrounded by a broken line in FIG. 6) are not performed.

For example, in the cache mode MD52 of the linking apparatus 50d, it is sufficient if the application software SW4 of the linking apparatus 50d withholds (described later) an operation of notifying the MFP 10 of distribution completion of the scan image to the distribution destinations. In other words, it is not necessary for the application software SW4 to use the information regarding the MFP 10 in the cache mode MD52 of the linking apparatus 50d.

Thus, the application software SW4 of the linking apparatus 50d does not use the cache information CN in the cache mode MD 52, and accordingly, the linking apparatus 50d determines that it is not necessary to receive the cache information CN.

In this case, as shown in FIG. 7, since it is not necessary to transmit/receive the cache information CN, the processing of steps S3 to S7 is not performed, and the processing of steps S8 and S9 is immediately performed.

Specifically, in the case where it is determined in step S2 that it is not necessary to receive the cache information CN, the operation mode control unit 61 of the linking apparatus 50 shifts the linking apparatus 50 to the cache mode MD52 in response to the shift command SG1 from the MFP 10, and notifies the MFP 10 of completion of the shift to the cache mode MD52 (step S8).

Then, the power saving mode control unit 11 of the MFP 10 receives the shift completion signal SG5 from the linking apparatus 50, and executes the shift to the power saving mode MD12 (step S9). As mentioned above, in the case where the MFP 10 is linked with the plurality of linking apparatuses 50, the power saving mode control unit 11 shifts to the power saving mode MD12 in response to the reception of the shift completion signals SG5 from all of the linking apparatuses 50.

<4-4. Operations During Cache Mode>

Figure 8:
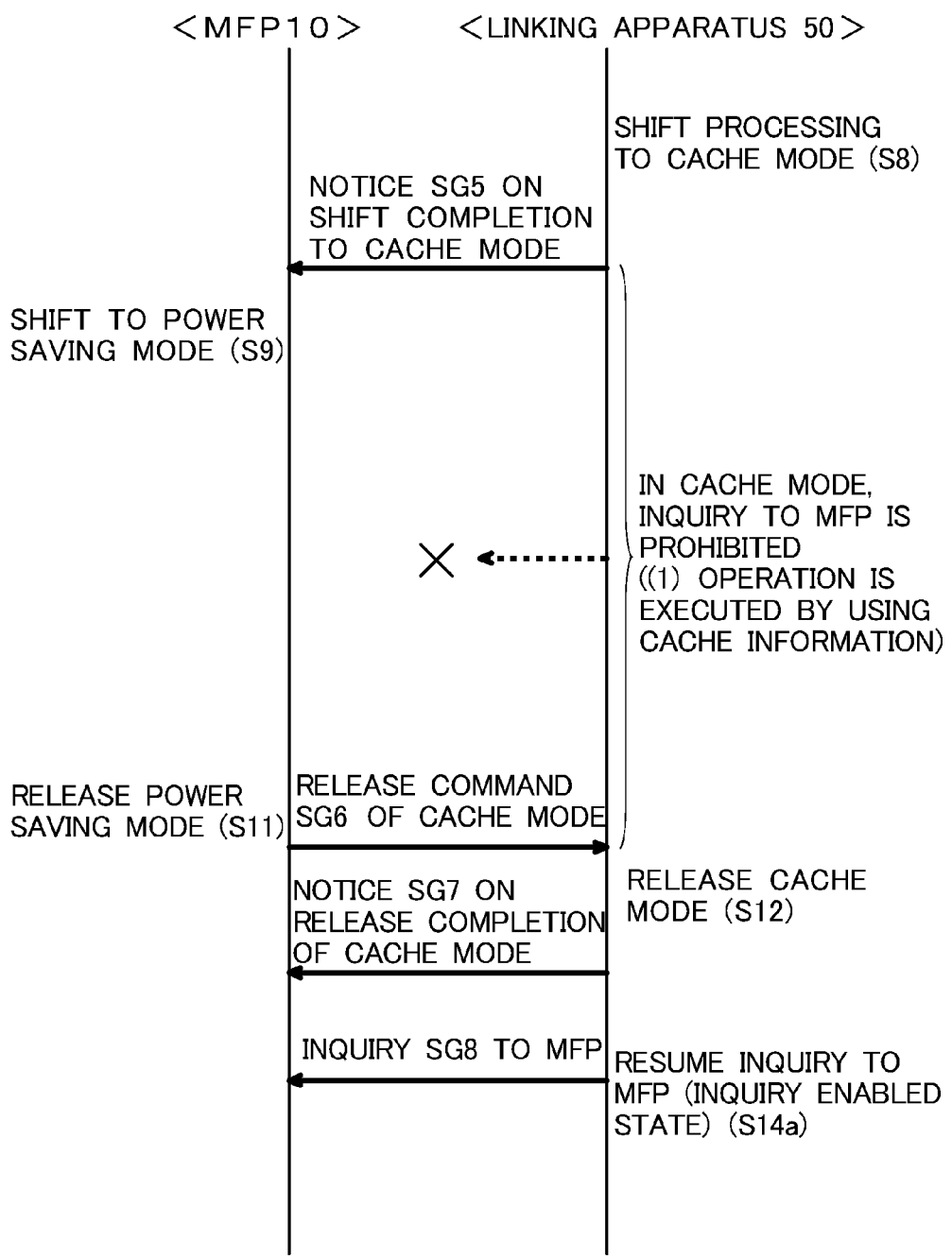
FIG. 8 is a chart showing operations in this system.
Figure 9:
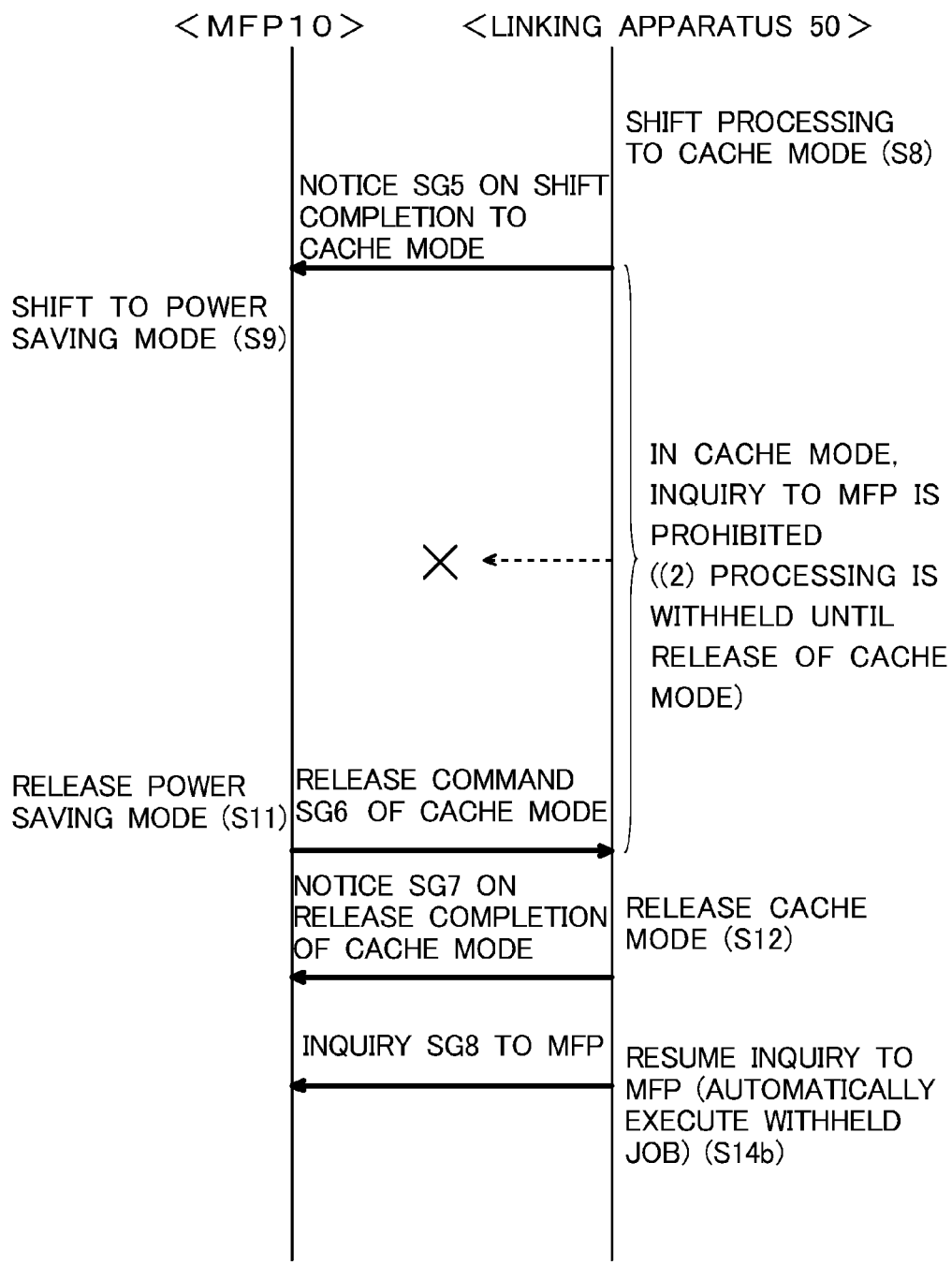
FIG. 9 is a chart showing operations in this system.

Next, a description is made of operations during the cache mode MD52 while referring to FIGS. 8 and 9. In FIG. 8, operations in the case where linking destinations of the MFP 10 are the linking apparatuses 50a, 50b and 50c are shown, and in FIG. 9, operations in the case where the linking destinations of the MFP 10 are the linking apparatuses 50d and 50e are shown.

As shown in FIGS. 8 and 9, after the shift to the cache mode MD52 (that is, during the cache mode MD52), the access control unit 62 of the linking apparatus 50 prohibits the contact (inquiry and the like) with the MFP 10, which is performed for the purpose of executing specific operations in the linking apparatus 50. In short, the communication from the linking apparatus 50 to the MFP 10 is prohibited in principle.

Then, for example as shown in FIG. 8, in the linking apparatus 50a and the like, the specific operations are executed by using the cache information CN stored in the storage unit 55.

Specifically, in the linking apparatus 50a, the toner residual amount information of the MFP 10 is displayed based on the toner residual amount information acquired as the cache information CN. In particular, during the power saving mode MD12 of the MFP 10, since the toner residual amount of the MFP 10 is not changed, the toner residual amount, which is accurate, is displayed in the linking apparatus 50a even if the cache information CN is used. Thus, the linking apparatus 50a is capable of appropriately executing the specific operation (display operation of the toner residual amount information (printer information)) even during the cache mode MD52.

In the linking apparatus 50*b*, the list information of the predetermined box of the MFP 10 is displayed based on "list information of the predetermined box of the MFP 10" acquired as the cache information CN. In particular, during the power saving mode MD12 of the MFP 10, since document information of the predetermined box of the MFP 10 is not changed, the list information, which is accurate, is displayed in the linking apparatus 50*b* even if the cache information CN is used. Thus, the linking apparatus 50*b* is capable of appropriately executing the specific operation (display operation of the list information of the predetermined box of the MFP 10) even during the cache mode MD52.

In the linking apparatus 50*c*, the usage track record information of the MFP 10 is acquired and accumulated based on "usage track record information (log information, count information and the like) of the MFP 10" acquired as the cache information CN. In particular, during the power saving mode MD12 of the MFP 10, since the usage track record information of the MFP 10 is not changed, the usage track record information, which is accurate, is acquired and accumulated in the linking apparatus 50*c* even if the cache information CN is used. Thus, the linking apparatus 50*c* is capable of appropriately executing the specific operations (acquiring operation of the usage track record information of the MFP 10, and the like) even during the cache mode MD52.

Moreover, for example as shown in FIG. 9, the execution of the specific operations is withheld in the linking apparatuses 50*d* and the like.

Specifically, in the linking apparatus 50*d*, even if a distribution operation of distributing the scan image to the plurality of distribution destinations is entirely completed, a completion reporting operation to the MFP 10 is withheld during the cache mode MD52. In particular, even in the case where the distribution operation is started before the shift to the cache mode MD52, when the distribution operation is completed after the shift to the cache mode MD52, the completion reporting operation to the MFP 10 is withheld. As will be described later, such a withholding state is continued at least until a point of time when the cache mode is released, and after the cache mode is released, such a job thus withheld is automatically executed. Specifically, the completion reporting operation to the MFP 10 is executed after the cache mode is released. Thus, the linking apparatus 50*d* is capable of appropriately executing the specific operation (operation of reporting, to the MFP 10, that the distribution of the scan image to the predetermined distribution destinations is completed) after the cache mode MD52 is released.

In the linking apparatus 50*e*, even if operation input of reflecting the setting information of the linking apparatus (MPF) 50*e* on the setting information of the MFP 10 is performed during the cache mode MD52, such an operation of reflecting the setting information is withheld. As will be described later, such a withholding state is continued at least until a point of time when the cache mode is released, and after the cache mode is released, such a job (operation of reflecting the setting information) thus withheld is automatically executed. Thus, the linking apparatus 50*e* is capable of appropriately executing the specific operation (operation of reflecting the setting information) after the cache mode MD52 is released.

Here, as mentioned above, after the shift to the cache mode MD52 (that is, during the cache mode MD52), the contact (communication) with the MFP 10, which is performed for the purpose of executing the specific operations in the respective linking apparatuses 50, is prohibited (FIGS. 8 and 9).

Hence, the MFP 10 does not have to return from the power saving mode in response to the inquiry (communication) from the linking apparatus 50. Specifically, the MFP 10 is suppressed from returning from the power saving mode. Therefore, the MFP 10 is capable of further enhancing such a power reduction effect.

Moreover, in the case where the server makes the proxy responses to the inquiries from the external apparatuses as in the above-described related art, the loads are concentrated onto the server. As opposed to this, in accordance with the above-described embodiment, it is also possible to avoid the concentration of the loads to the server, which has occurred in the related art. Furthermore, in comparison with the case of managing programs in a centralizing manner on the server side, it is easy to implement the programs. Moreover, data can be stored more dispersedly than in the case of managing the data in the server in the centralizing manner, and accordingly, high confidentiality is ensured. In particular, only information (information for the specific operation) necessary in each of the apparatuses 50 is transmitted to each of the apparatuses 50, and extra information (information necessary in the other apparatuses) is not transmitted thereto. For example, while information such as the toner information is transmitted to the linking apparatus 50*a*, information such as the box document list data for the linking apparatus 50*b* is not transmitted to the linking apparatus 50*a*. Hence, the high confidentiality is ensured.

Moreover, during the execution of the cache mode MD52, the inquiry (communication) itself from each of the linking apparatuses 50 to the MFP 10 is eliminated, and accordingly, it is also possible to reduce a communication data amount. In particular, in comparison with the case where the server makes the proxy responses to the inquiries from the external apparatuses as in the related art, it is possible to reduce the communication data amount.

Moreover, in the decision operation for the linking apparatuses 50, which is as mentioned above, it is preferable that only some apparatuses among the plurality (N pieces) of apparatuses connected to the network NW be selected as the linking apparatuses 50. For example, it is preferable that only several to several ten apparatuses among totally 200 apparatuses in the network NW be selected as the linking apparatuses 50. In accordance with this, communication with unselected apparatuses does not have to be performed at the time of shifting to the cache mode MD52, the transmission itself of the data is avoided. Hence, the confidentiality can be held, and in addition, the communication data amount can also be reduced.

<4-5. Operation After End of Cache Mode>

Next, while referring to FIGS. 8 and 9, a description is made of a return operation from the cache mode MD52 to the normal mode MD51, in other words, a release operation (end operation) of the cache mode MD52.

When such a condition is established that the operation input to the operation input unit of the MFP 10 is given, the power saving mode control unit 11 of the MFP 10 decides to return from the power saving mode MD12 to the normal mode MD11. Then, the operation mode of the MFP 10 returns from the power saving mode MD12 to the normal mode MD11 (step S11). In other words, the power saving mode MD12 of the MFP 10 is ended.

Then, the mode shift command unit 13 of the MFP 10 transmits, to the linking apparatus 50, a return command (also referred to as a release command of the cache mode MD52) SG6 from the cache mode MD52 in response to the end of the power saving mode MD 12.

The operation mode control unit 61 of the linking apparatus 50 returns the linking apparatus 50 from the cache mode MD52 in response to the return command SG6, and thereafter, notifies the MFP 10 of completion of the return from the cache mode MD52 (that is, a return completion signal SG7) (step S12). Note that the completion of the return from the cache mode MD52 is also expressed as completion of the release of the cache mode MD52.

Moreover, as shown in FIG. 9, after the return from the cache mode MD52, the access control unit 62 of the linking apparatus 50 executes the withheld specific operations while being accompanied with communication from the linking apparatus 50 to the MFP 10 (step S14*b*). Specifically, the specific operations withheld in the linking apparatus 50*d* and the like are automatically executed.

For example, the linking apparatus 50*d* automatically executes such a distribution completion reporting operation that is withheld. Specifically, the linking apparatus 50*d* transmits the distribution completion report of the scan image to the MFP 10. Thus, the linking apparatus 50*d* is capable of appropriately executing the specific operation (completion reporting operation to the MFP 10) after the release of the cache mode MD52.

In a similar way, the linking apparatus 50*e* automatically executes such a withheld setting reflecting operation. In such a way, the linking apparatus 50*e* is capable of appropriately executing the specific operation (setting reflecting operation to the MFP 10) after the release of the cache mode MD52.

Moreover, as shown in FIG. 8, after the return from the cache mode MD52, the normal operations are executed in the normal mode MD51. Specifically, each of the linking apparatuses 50 returns to the state where the specific operation is executable, which is accompanied with the contact (inquiry and the like) with the MFP 10. Then, each of the linking apparatuses 50 individually executes the specific operation at appropriate timing while being accompanied with the contact from the linking apparatus 50 to the MFP 10 (step 514*a*).

Note that, here, FIG. 9 illustrates the case where the specific operation withheld during the cache mode MD52 is automatically executed after the release of the cache mode MD52; however, the present invention is not limited to this case. For example, in the case of having received an execution command regarding the specific operation from the operator during the cache mode MD52, the linking apparatus 50 may notify the operator that the specific operation is inexecutable, and may avoid automatically executing the specific operation after the release of the cache mode MD52.

5. Modification Examples and the Like

The description has been made above of the embodiment of the present invention; however, the present invention is not limited to the contents described above.

First Modification Example

Advance Notice of Shift to Power Saving Mode, Advance Transfer of Cache Information and the Like For example, in the above-described embodiment, the case (step S1 of FIG. 6) is illustrated where it is decided that the MFP 10 is to shift from the normal mode MD11 to the power saving mode MD12 when the condition that the command input to the MFP 10 is not given for the fixed time is established; however, the present invention is not limited to this. Specifically, the MFP 10 may shift to the power saving mode MD12 by a timer function. More specifically, the MFP 10 may be set to operate in the power saving mode MD12 for a predetermined period (as an example, a business unbusy time such as a time from 0 o'clock in the afternoon to 1 o'clock in the afternoon and a time from 8 o'clock in the afternoon to 8 o'clock in the following morning).

Moreover, in such a case, a notice on a scheduled start time and the like of the power saving mode MD12 may be issued in advance from the MFP 10 to the linking apparatus 50, and the cache information CN may be transferred in advance therebetween. A description is made below of the modification example (also referred to as a first modification example) while referring to FIG. 10.

Here, the case is assumed where the MFP 10 is set to operate in the power saving mode MD12 during a predetermined period TM32 (specifically, from 0 o'clock in the afternoon to 1 o'clock in the afternoon).

Figure 10:
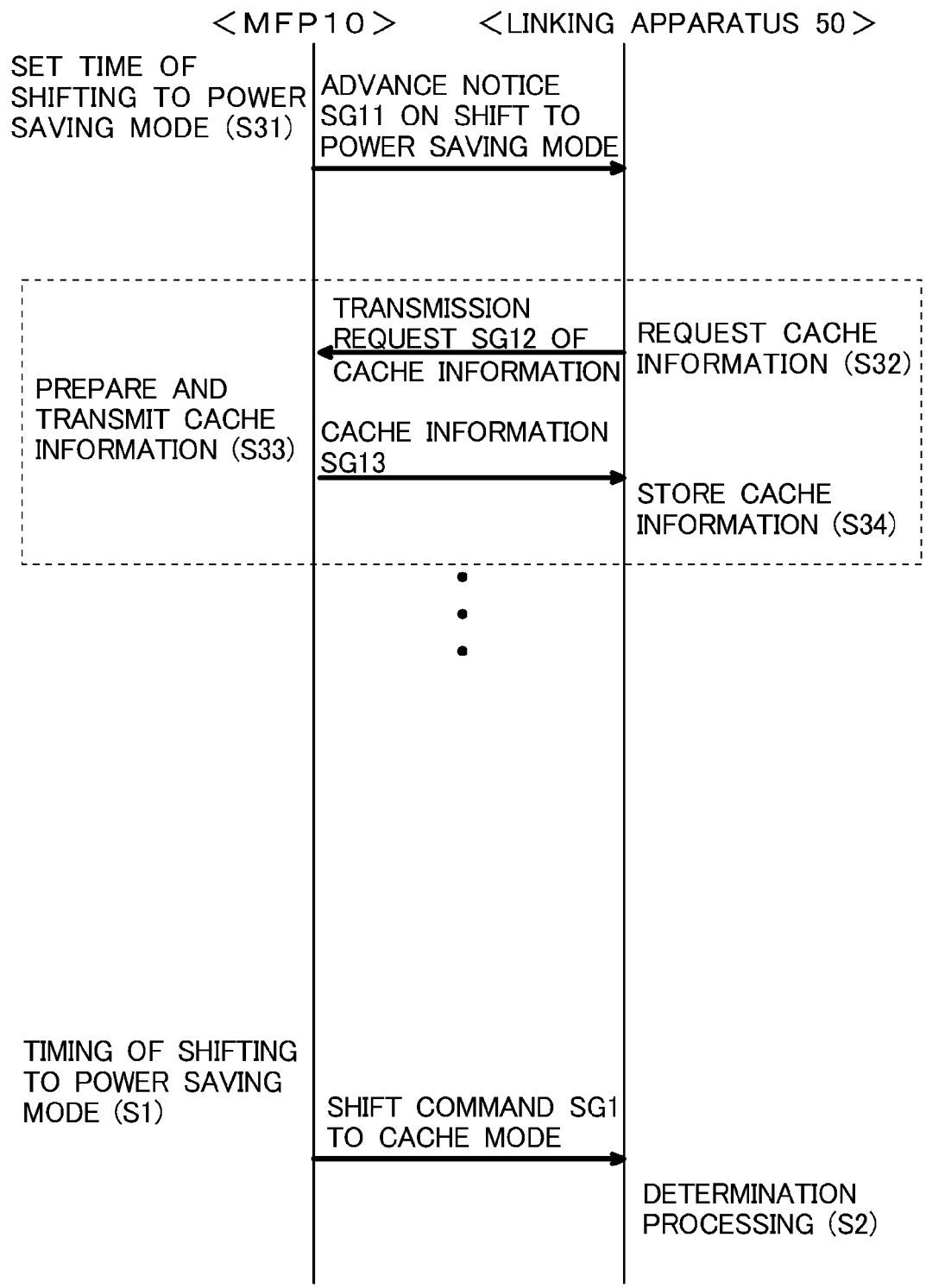
FIG. 10 is a chart showing operations according to a modification example.

As shown in step S31 of FIG. 10, at an advance notice issuance time (10 o'clock in the morning) that is a predetermined time (for example, two hours) before the scheduled start time (0 o'clock in the afternoon) of the power saving mode MD12, the mode shift command unit 13 of the MFP 10 transmits an advance notice SG11 of the power saving mode MD12 to the linking apparatus 50. The advance notice SG11 is notice information including: the scheduled start time ("0 o'clock in the afternoon") of the power saving mode MD12; and a scheduled end time ("1 o'clock in the afternoon") of the power saving mode MD 12.

Then, the transfer of the cache information CN is performed in a period TM 31 (period of two hours) between the advance notice issuance time (10 o'clock in the morning) and the scheduled start time (0 o'clock in the afternoon).

Specifically, at a predetermined time in the period TM31, the operation mode control unit 61 of the linking apparatus 50 transmits a transmission request SG12 of the cache information CN to the MFP 10 (step S32). Upon receiving the transmission request SG12, the information transmission unit 14 of the MFP 10 transmits the cache information CN (SG13) to the linking apparatus 50 in response to the reception of the transmission request SG12 (step S33). Upon receiving the cache information CN, the linking apparatus 50 stores the cache information CN in the storage unit 55 (step S34).

Thereafter, at the time of the shift to the power saving mode MD12 (that is, on and after step S1), the operations of steps S3 to S7 of FIG. 6 are not performed, but the MFP 10 immediately shifts to the power saving mode MD12.

The transfer of the cache information CN, which is described as above, is performed prior to the shift to the power saving mode MD12 (steps S32 to S34), whereby it is possible to prevent a shift delay (which stands for that the shift to the power saving mode MD12 is delayed) caused by the fact that the transmissions/receptions of the cache information CN are executed concentratedly at the time of the shift to the power saving mode MD12. For example, a communication delay can be prevented, which may occur in the case where several ten linking apparatuses 50 simultaneously start to make communications at the time of the shift to the power saving mode MD12.

Moreover, it is preferable that the transfer of the cache information CN, which is described as above, be performed at a time relatively near the scheduled start time (that is, for example, immediately before the scheduled start time) in the period TM31. In accordance with this, the linking apparatus 50 can receive in advance relatively new information as the cache information CN (SG13). Moreover, in particular, it is preferable to adjust such communication timing of the cache information CN in response to a request degree for information freshness from each of the linking apparatuses 50 (or to a degree of emergency or the like). It is preferable that, for example, the linking apparatus 50 acquire information with a low information update frequency on ahead and acquire information with a high information update frequency later. In detail, the printer information for use in the printer driver SW1 of the linking apparatus 50a, specifically, optional device configuration information (such as to whether or not there is an optional function (finish function (staple function) of the MFP 10) may be acquired at a relatively earlier stage (for example, ten minutes before the scheduled start time). Meanwhile, it is preferable that the usage track record information for use in the software SW3 of the linking apparatus 50c, specifically, count value information and the like be acquired at a relatively later stage (for example, one minute to several ten seconds before the scheduled start time).

Moreover, here, the case is illustrated where, at the time of the shift to the power saving mode MD12, the operations of steps S3 to S7 of FIG. 6 are not performed, but the MFP 10 immediately shifts to the power saving mode MD12; however, the present invention is not limited to this. For example, similar operations to those (steps S3 to S7) of FIG. 6 may be executed in the event where such advance transmission/reception of the cache information CN, which is as shown in FIG. 10, is executed and where the MFP 10 shifts to the power saving mode MD12. In particular, at the time of the shift to the power saving mode MD12, it is preferable that difference data of the cache information CN be received. In this case, the advance transmission/reception of the cache information CN, which is as shown in FIG. 10, makes it possible to reduce data amount of the cache information CN (difference data) to be transmitted at the time of the shift to the power saving mode MD12.

Moreover, in particular, the transfer of the cache information CN, which is described as above, may be repeatedly executed plural times in the period TM31. For example, a collection operation of the log information (difference data) by the software SW3 of the linking apparatus 50c may be executed periodically and repeatedly. In accordance with this, the communication data amount per communication can be reduced, and in addition, it is possible to reduce the data amount of the cache information CN to be transmitted immediately before the shift to the power saving mode MD12 or at the time of the shift thereto.

Second Modification Example

Advance Notice of End Time of Power Saving Mode, and the Like

Moreover, the scheduled end time of the power saving mode MD12 may be used as follows. A description is made below of a modification example (also referred to as a second modification example) related to a using example of the scheduled end time of the power saving mode MD12. The second modification example is one further modified from the first modification example, and a description is made below mainly of different points from the first modification example.

Note that, in the above-described embodiment and the like, with regard to the print command output operation of the printer driver SW1, the case has been illustrated where the contact (communication) prohibiting operation in the cache mode MD52 is not applied thereto; however, in this second modification example, also with regard to the print command output operation of the printer driver SW1, the contact (communication) prohibiting operation in the cache mode MD52 is applied thereto. Specifically, the print command output operation of the printer driver SW1 is also adopted as the "specific operation". In other words, the linking apparatus 50a puts higher priority on the maintenance of the power saving mode MD12 than on the print output operation. Specifically, the printer driver SW1 of the linking apparatus 50a withholds the execution of the print command output operation for the MFP 10 after the shift to the cache mode MD52. In accordance with this, such a power saving effect in the MFP 10 can be increased.

Figure 11:
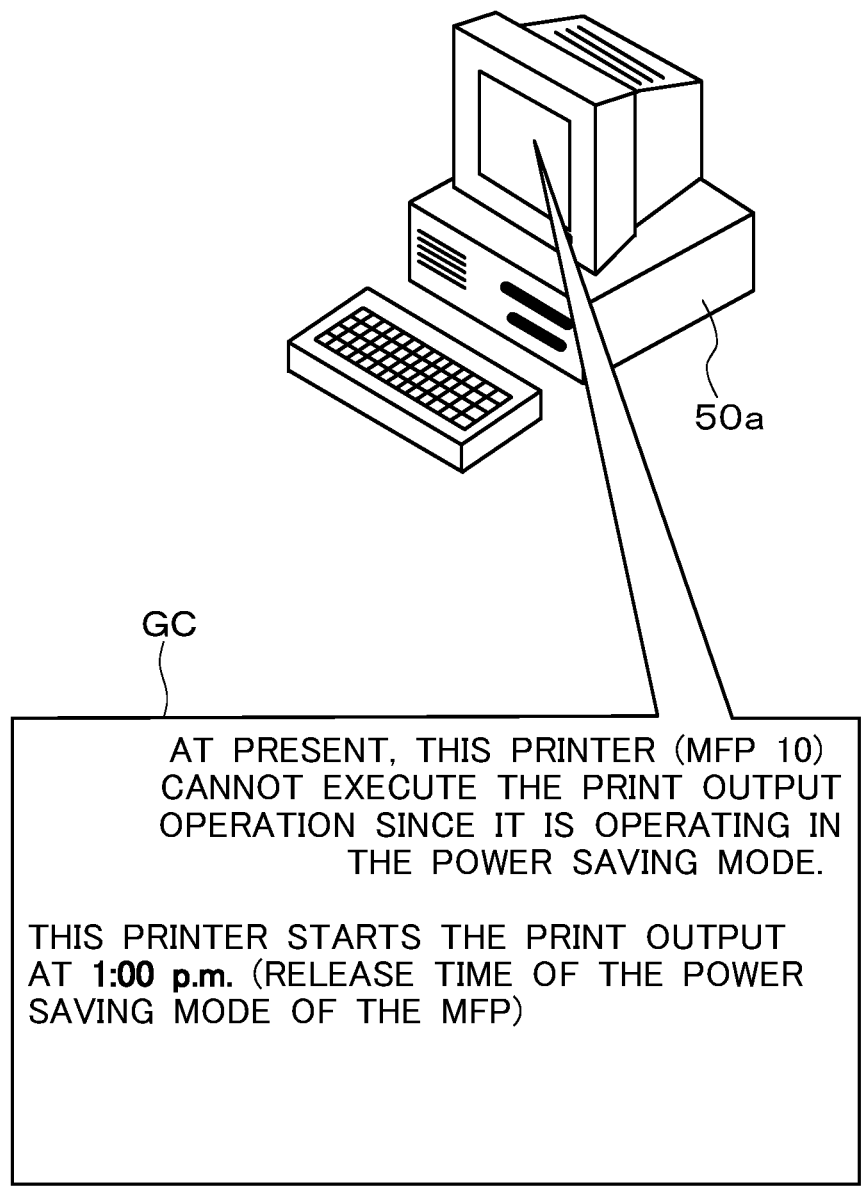
FIG. 11 is a view showing a display screen of a linking apparatus according to the modification example.

More specifically, upon receiving a print command operation from the operator during the cache mode MD52, the printer driver SW1 of the linking apparatus 50a withholds the execution of the print output command, which is based on the print command operation, and in addition, displays a screen GC as shown in FIG. 11 on the display unit of the linking apparatus 50a. On the screen GC, the following character information or the like is displayed: which is "At present, this printer (MFP 10) cannot execute the print output operation since it is operating in the power saving mode. This printer starts the print output at 1 p.m. (release time of the power saving mode of the MFP)". Specifically, a scheduled release time of the power saving mode MD12 of the MFP 10 (in other words, a scheduled end time of the cache mode MD52) is displayed as a scheduled resume time (scheduled execution time) of the print command output operation to the MFP 10. Such operations as described above are executed by the access control unit 62 and the like of the linking apparatus 50.

In accordance with this, the operator is capable of getting to know the scheduled resume time.

Then, in a similar way to FIG. 9, the withheld job is executed after the release of the cache mode MD52 (step S14b). In such a way, the operator can obtain print outputs.

Moreover, here, the case has been illustrated where the notice on the scheduled end time ("1 o'clock in the afternoon") of the power saving mode MD12 is issued accompanying the advance notice SG11 of the power saving mode MD12; however, the present invention is not limited to this. It is sufficient if the notice on the scheduled end time of the power saving mode MD12 is issued until before the MFP 10 shifts to the power saving mode MD12 (in other words, before the shift to the cache mode MD52), and for example, the notice may be issued together with the shift command SG1 at the point of time (step S1) immediately before the shift to the power saving mode MD12.

Note that, in FIGS. 12 and 13, the operations and the like for each of the applications according to the above-described embodiment, the first modification example and the second modification example are shown while being summarized in a table format. For example, as shown in FIGS. 12 and 13, it is possible to execute each of the operations at each timing for each application. However, a different operation may be executed at each timing without being limited to such a mode.

<Others>

Moreover, in the above-described embodiment and the like, the MFP has been illustrated as the image forming apparatus; however, without being limited to this, the above-described idea may be applied to other image forming apparatuses such as a single-function printer.

Furthermore, in the above-described embodiment and the like, five linking apparatuses 50a to 50e have been illustrated; however, apparatuses of other types may be adopted without being limited to this. Moreover, the software executed in each of the linking apparatuses 50 is not limited to that mentioned above, and may be software of another type.

While the invention has been shown and described in detail, the foregoing description is in all aspects illustrative and not restrictive. It is therefore understood that numerous modifications and variations can be devised without departing from the scope of the invention.

What is claimed is:

1. An image forming system comprising:
   an image forming apparatus; and
   a linking apparatus that is connected to the image forming apparatus through a network, is linked with the image forming apparatus, and executes a specific operation, wherein
   the linking apparatus is operable in any of a plurality of operation modes including a first mode of contacting the image forming apparatus and executing the specific operation and a second mode of not contacting the image forming apparatus for a purpose of executing the specific operation,
   the image forming apparatus includes:
   a mode shift command unit that, when the image forming apparatus shifts to a power saving mode, notifies the linking apparatus of a shift command indicating that the linking apparatus should be shifted to the second mode,
   the linking apparatus includes:
   an operation mode control unit that shifts the linking apparatus to the second mode based on the shift command;
   a determination unit that, in response to the shift command, determines whether or not to receive cache information for the specific operation from the image forming apparatus before the shift to the second mode in accordance with a type of the specific operation executed by the linking apparatus itself; and
   an access control unit that, after the shift to the second mode, prohibits the contact with the image forming apparatus, the contact being performed for the purpose of executing the specific operation, and
   in a case where it is determined that the cache information should be received,
   the operation mode control unit of the linking apparatus transmits a transmission request of the cache information to the image forming apparatus,
   an information transmission unit of the image forming apparatus transmits the cache information to the linking apparatus in response to reception of the transmission request, and
   the operation mode control unit of the linking apparatus shifts the linking apparatus to the second mode in response to reception of the cache information.

2. The image forming system according to claim 1, wherein the linking apparatus further includes:
   a storage unit that stores the cache information transmitted from the information transmission unit, and
   the access control unit of the linking apparatus executes the specific operation by using the cache information stored in the storage unit after the shift to the second mode, the shift being made in response to the shift command.

3. The image forming system according to claim 1, wherein the access control unit prohibits the execution of the specific operation after the shift to the second mode, the shift being made in response to the shift command.

4. The image forming system according to claim 1, wherein the operation mode control unit of the linking apparatus:
   in a case where it is determined that it is not necessary to receive the cache information, notifies the image forming apparatus of completion of the shift to the second mode after shifting the linking apparatus to the second mode in response to the shift command from the image forming apparatus; and
   in a case where it is determined that the cache information should be received, notifies the image forming apparatus of the completion of the shift to the second mode after shifting the linking apparatus to the second mode in response to completion of the reception of the cache information from the image forming apparatus.

5. The image forming system according to claim 1, wherein the mode shift command unit of the image forming apparatus transmits, to the linking apparatus, a return command from the second mode in response to end of the power saving mode, and
   the access control unit of the linking apparatus executes the specific operation while being accompanied with the contact with the image forming apparatus from the linking apparatus after a return from the second mode to the first mode, the return being made in response to the return command.

6. The image forming system according to claim 1, wherein the access control unit of the linking apparatus withholds the execution of the specific operation after the shift to the second mode, the shift being made in response to the shift command,
   the mode shift command unit of the image forming apparatus transmits, to the linking apparatus, a return command from the second mode in response to end of the power saving mode, and
   the access control unit of the linking apparatus executes the withheld specific operation while being accompanied with the contact with the image forming apparatus from the linking apparatus after a return from the second mode to the first mode, the return being made in response to the return command.

7. The image forming system according to claim 1, wherein the mode shift command unit of the image forming apparatus transmits, to the linking apparatus, a return command from the second mode in response to end of the power saving mode, and
   the operation mode control unit of the linking apparatus notifies the image forming apparatus of completion of a return from the second mode after returning the linking apparatus from the second mode in response to the return command.

8. The image forming system according to claim 1, wherein the mode shift command unit of the image forming apparatus notifies the linking apparatus of a scheduled start time of the power saving mode at a predetermined time before the scheduled start time,
   the operation mode control unit of the linking apparatus transmits the transmission request of the cache information for the specific operation to the image forming apparatus in a period between the predetermined time and the scheduled start time,
   the information transmission unit of the image forming apparatus transmits the cache information to the linking apparatus in response to the transmission request, and
   a storage unit of the linking apparatus stores the cache information transmitted from the information transmission unit in response to the transmission request.

9. The image forming system according to claim 1, wherein the mode shift command unit of the image forming apparatus notifies the linking apparatus of a scheduled end time of the power saving mode before the shift to the second mode, and
   after the shift to the second mode, the shift being made in response to the shift command, the access control unit of the linking apparatus withholds the execution of the specific operation, and displays the scheduled end time as a scheduled resume time of the specific operation on a display unit of the linking apparatus.

10. The image forming system according to claim 9, wherein
the specific operation is a print command output operation for the image forming apparatus.

11. The image forming system according to claim 1, wherein
the image forming apparatus further includes:
a decision unit that decides, based on job history information, the linking apparatus from among a plurality of apparatuses connected to the image forming apparatus through the network.

12. The image forming system according to claim 1, wherein
the image forming apparatus further includes:
a designation unit that designates the linking apparatus from among a plurality of apparatuses connected to the image forming apparatus through the network.

13. The image forming system according to claim 1, wherein
the linking apparatus is a computer in which a printer driver corresponding to the image forming apparatus is installed, and
the specific operation is a display operation of printer information regarding the image forming apparatus.

14. The image forming system according to claim 1, wherein
the linking apparatus is a computer in which a printer driver corresponding to the image forming apparatus is installed, and
the specific operation is a print output command operation for the image forming apparatus.

15. The image forming system according to claim 1, wherein
the linking apparatus is a computer in which application software that acquires usage track record information of the image forming apparatus is installed, and
the specific operation is an operation of acquiring the usage track record information.

16. The image forming system according to claim 1, wherein
the linking apparatus is a computer in which application software that acquires list information of a predetermined box of the image forming apparatus is installed, and
the specific operation is an operation of acquiring the list information.

17. The image forming system according to claim 1, wherein
the linking apparatus is a computer in which application software that distributes a scan image, the scan image being scanned by the image forming apparatus, to predetermined distribution destinations is installed, and
the specific operation is an operation of reporting, to the image forming apparatus, that the distribution of the scan image to the predetermined distribution destinations is completed.

18. The image forming system according to claim 1, wherein
the image forming apparatus is a first image forming apparatus,
the linking apparatus is a second image forming apparatus, and
the specific operation is an operation of reflecting setting information of the second image forming apparatus on setting information of the first image forming apparatus.

19. A linking apparatus that is connected to an image forming apparatus through a network, is linked with the image forming apparatus, and executes a specific operation, the linking apparatus comprising:
an operation mode control unit that sets an operation mode of the linking apparatus at any of a plurality of operation modes including a first mode of contacting the image forming apparatus and executing a specific operation and a second mode of not contacting the image forming apparatus for a purpose of executing the specific operation;
a determination unit that, in response to a shift command notified by the image forming apparatus and indicating that the linking apparatus should be shifted to the second mode, determines whether or not to receive cache information for the specific operation from the image forming apparatus before the shift to the second mode in accordance with a type of the specific operation executed by the linking apparatus itself; and
an access control unit that, after the shift to the second mode, prohibits the contact with the image forming apparatus, the contact being performed for the purpose of executing the specific operation,
wherein, in a case where it is determined that the cache information should be received,
the operation mode control unit of the linking apparatus transmits a transmission request of the cache information to the image forming apparatus,
an information transmission unit of the image forming apparatus transmits the cache information to the linking apparatus in response to reception of the transmission request, and
the operation mode control unit of the linking apparatus shifts the linking apparatus to the second mode in response to reception of the cache information.

20. A non-transitory recording medium that records a computer program therein, the computer program causing a computer to execute processing, the computer being built in a linking apparatus that is connected to an image forming apparatus through a network, is linked with the image forming apparatus, and executes a specific operation, the processing comprising the steps of:
a) receiving a shift command notified by the image forming apparatus and indicating that the linking apparatus should be shifted to any one operation mode among a plurality of operation modes including a first mode of contacting the image forming apparatus and executing the specific operation and a second mode of not contacting the image forming apparatus for a purpose of executing the specific operation;
b) determining, in response to the shift command indicating that the linking apparatus should be shifted to the second mode, whether or not to receive cache information for the specific operation from the image forming apparatus before the shift to the second mode in accordance with a type of the specific operation executed by the linking apparatus itself;
c) transmitting a transmission request of the cache information to the image forming apparatus in a case where it is determined, in the step b), that the cache information should be received;
d) receiving the cache information transmitted from the image forming apparatus in response to reception of the transmission request;
e) shifting the linking apparatus to the second mode in response to reception of the cache information, and thereafter prohibiting the contact with the image forming apparatus, the contact being performed for the purpose of executing the specific operation.

* * * * *